United States Patent [19]
Mason

[11] 3,821,747
[45] June 28, 1974

[54] RECORDING SYSTEM HAVING PIEZOELECTRIC STYLUS DRIVE MEANS

[75] Inventor: Harry Mason, Albuquerque, N. Mex.

[73] Assignee: The United States of America as represented by the United States Atomic Energy Commission, Washington, D.C.

[22] Filed: Apr. 23, 1973

[21] Appl. No.: 353,254

[52] U.S. Cl. .................. 346/62, 310/8.6, 346/112, 346/139 R
[51] Int. Cl. ............................................. G01d 9/32
[58] Field of Search ......... 346/139 R, 49, 114, 116, 346/117, 62, 112; 310/8.5, 8.6; 179/100.41 P

[56] References Cited
UNITED STATES PATENTS

| | | |
|---|---|---|
| 1,802,782 | 4/1931 | Sawyer .................................. 310/8.6 |
| 2,150,729 | 3/1939 | Offner .................................. 346/117 |
| 3,109,058 | 10/1963 | Luhn .................................. 346/35 X |
| 3,133,782 | 5/1964 | Woods .................................. 346/33 R |

*Primary Examiner*—Joseph W. Hartary
*Attorney, Agent, or Firm*—John A. Horan; Richard E. Constant

[57] ABSTRACT

A recording system is described which utilizes one or more elongated multilayer piezoelectric elements supported adjacent one end with other end free for sideways bending movements, and carrying a stylus at the free end, with a recorder medium in contact with the stylus and relatively movable one with respect to the other, and means for selectively vibrating the multilayer element by oscillating electrical signals which are proportional to the information which is to be recorded.

1 Claim, 6 Drawing Figures

3,821,747

RECORDING SYSTEM HAVING PIEZOELECTRIC STYLUS DRIVE MEANS

BACKGROUND OF INVENTION

Data or information from an event or occurrence are commonly visibly recorded on paper or other material tapes or charts by various electromechanical driven pens or stylii. The data or information may be in either analog or digital form which may be appropriately converted into electrical signals representative thereof and in turn induce corresponding movement of a pen or stylus across the paper. The paper or other recording medium thus provides a visible representation of the data or information.

These chart-recorders generally require relatively bulky and heavy mechanisms to operate the recording pens or stylii which in turn required relatively large amounts of electrical power to produce the recorded information. In addition, these recorders often require sophisticated and complicated electronic circuitry to achieve the desired recordation. Some recorders were only capable of producing fine lines of low contrast and poor resolution on the recording medium which are frequently difficult to see or read.

Existing chart marking recorders commonly utilize magnetically deflected stylii, electric arcs, electrochemical printers, and impression printers and the like. The magnetically deflected stylii require excessive power, are quite bulky and heavy and do not permit close spacing between information channels on the recording medium. Electric arc printers generally require excessive power and utilize chart paper that may be vulnerable to damage by environmental factors and lack ruggedness. Electrochemical and impression printers are of far too great a bulk and weight for easy portability.

SUMMARY OF INVENTION

In view of the above, it is an object of this invention to provide recorder means which is capable of producing a highly visible recording of data or information of either digital or analog form with the application of only very low levels of electrical energy.

It is a further object of this invention to provide a relatively compact, lightweight and highly portable multichannel chart recorder system.

It is a further object of this invention to provide a recorder system in which the recorded information has high constrast and resolution which is easily read and interpreted by an operator or automated scanner.

It is a still further object of this invention to provide such recorder systems which are both rugged and portable.

Various other objects and advantages will appear from the following description of the invention, and the most novel features will be particularly pointed out hereinafter in connection with the appended claims. It will be understood that various changes in the details, materials and arrangements of the parts, which are herein described and illustrated in order to explain the nature of the invention may be made by those skilled in the art.

The invention comprises a recording system which utilizes one or more multilayer elements which have a pair of piezoelectric plates separated by an electrically conductive layer, means for rigidly supporting the elements in parallel at one end thereof leaving the remaining ends free for movement, stylii mounted on the free ends of the elements in contact with a recording paper or medium, and electrical means for inducing oscillating motion in the multilayer elements transverse to the direction of movement of the recording medium and representative of information or data which is desired to record by oscillatory motion of the stylus on the recording medium.

DESCRIPTION OF DRAWING

The invention is illustrated in the accompanying drawing wherein.

DETAILED DESCRIPTION

Figure 1:
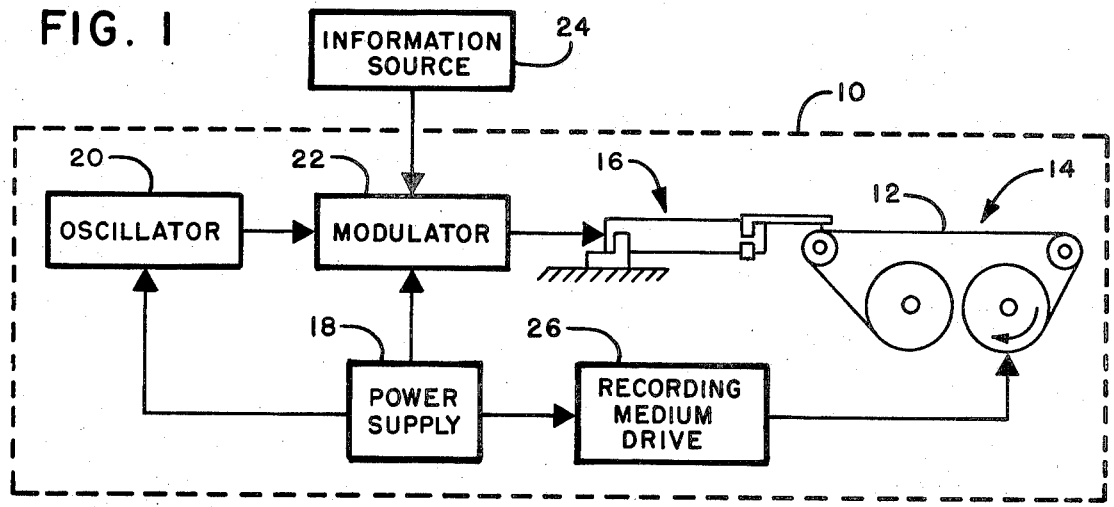
FIG. 1 is a diagrammatic representation of the overall recording system of this invention.

The recording system 10 of this invention, as shown in FIG. 1, utilizes a multilayer recording element which is operated in a manner to produce an easily read indication of the data or information being recorded with the use of electronic circuitry and techniques which require very low power consumptions and which may be packaged in a relatively small and lightweight arrangement. The recorder system 10 includes a recording medium or paper 12 supported on appropriate supporting and transport mechanism 14 for bringing the recording medium into contact with one or more multilayer elements, a single multilayer element 16 is shown in this figure for purpose of illustration, and appropriate electrical control circuitry to operate them. The electrical circuitry includes a suitable power supply 18, which in the case of a portable recorder system may be a storage battery, an oscillator circuit 20 and a modulator circuit 22 which modulates the oscillator 20 output signal in accordance with an input information or data signal from a suitable source 24. The power supply 18 may also provide the necessary power to actuate and operate the recording medium drive 26 and transport mechanism 14.

The recording medium 12 in this recording system is preferably a pressure sensitive recorder paper or film on which visible marks or lines may be produced by application of pressure against the paper. Such recording mediums eliminate the requirement that the recording elements carry some ink or the like to produce the desired marks or other indications on the paper. Other types of recording mediums and indicators may be utilized including such as materials in which an impression may be produced by pressure applied thereto, a paper having an opaque layer which may be partially removed or the more standard types of paper and ink arrangements, the latter however adding to the overall complexity and size of the recording system. The recording medium 12 may be carried and transported past the recording elements by use of various combinations of storage and takeup rollers or wheels and guide rollers, such as in the arrangement shown diagrammatically by mechanism 14 in FIG. 1, or in any suitable manner which will provide for the support and movement of the recording medium 12 in the desired manner past the recording elements. The recording medium drive 26 may include whatever motors or other driving mechanisms needed to provide this recording medium 12 transport at one or more transport speeds and with or without synchronization with the information source 24 and oscillator 20. These may be housed within conventional supporting apparatus and containers to permit the replacement of recording mediums and positioning thereof in the desired relationship with the recording elements, as described more fully below.

Figure 2:
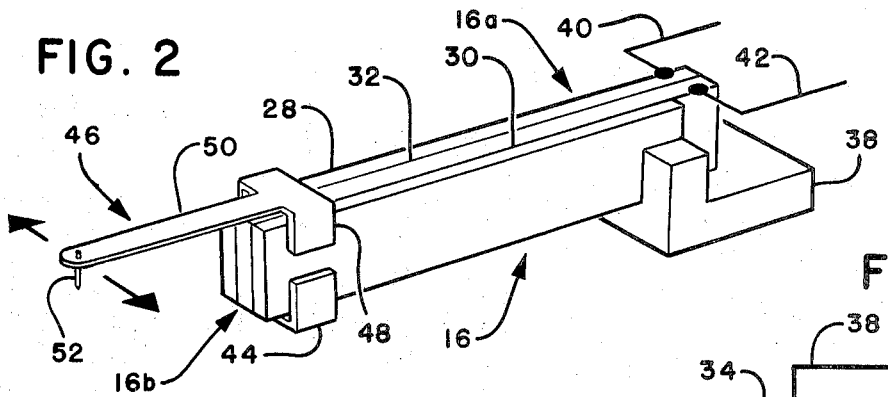
FIG. 2 is a perspective view of one of the multilayer recording elements utilized in the system of FIG. 1.
Figure 3:
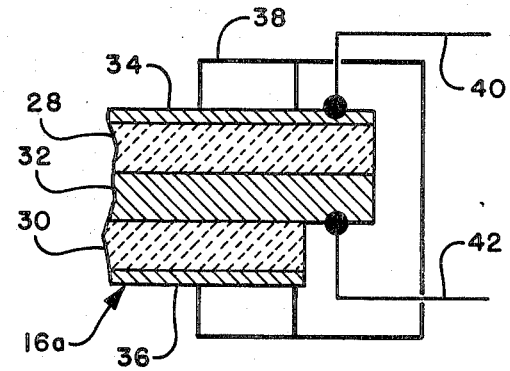
FIG. 3 is a fragmentary cross sectional view of a portion of the multilayer element of FIG. 2.

The recording elements, as illustrated by the multilayer element 16 shown in FIG. 1 and in greater detail in FIGS. 2 and 3, each include first and second piezoelectric plates 28 and 30 separated and sandwiched about an intermediate electrically conductive layer or film 32. The outer surfaces of the piezoelectric plates 28 and 30 are appropriately coated or otherwise covered with conductive layers 34 and 36 for application of electric fields to the piezoelectric material over their entire area and volume. The piezoelectric plates and conductive layers are made in an elongated form, as shown, and electrical fields applied thereto to induce a bending movement in a direction perpendicular to the major surfaces of the plates and layers, that is, perpendicular to the stack or sandwich, in direction determined by the polarity of the electric fields and the characteristics of the piezoelectric plates 28 and 30. The multilayer element 16 is preferably rigidly supported and clamped at or near one end of the sandwiched plates and layers (such as at or near end 16a) so that the electric field induced movement or bending of the element will be translated to movement of the remaining free end 16b of element 16, such as by the slotted support 38. The outer conductive layers 34 and 36 and other portions of the multilayer element 16 may be adhesively or otherwise rigidly secured to the slot in support 38. Electric fields may be applied to the piezoelectric plates 28 and 30 in any appropriate manner which will provide the desired movement of the free end of the multilayer element 16, for example, by application of an appropriate conductive lead 40 to one of the outer conductive layers (such as layer 34), the application of a conductive lead 42 to the conductive layer 36, and the electrical interconnection of layers 34 and 36 by a conductive strap or shorting loop 44 coupled from one conductive layer to the other of multilayer element 16. This arrangement effectively connects the respective piezoelectric plates of the multilayer element 16 in electrical parallel. In such an arrangement, the application of a voltage between leads 40 and 42 should produce an electric field through piezoelectric plates 28 and 30 and induce an elongation of one of the piezoelectric plates and a shrinking of the other piezoelectric plate in the direction of the length of the multilayer element 16 thus providing a movement of the free end 16b of the element in the direction of the shrinking piezoelectric plate. An electric field in the opposite direction will provide the opposite expansion and shrinking together with the opposite movement. It is understood that the respective conductive leads and shorting loops may be appropriately soldered, brazed or otherwise conductively fastened to the respective conductive layers in a manner well known in the art. By proper selection of piezoelectric plate characteristics, the same bending may be achieved by applying a voltage across conductive layers 34 and 36 in a "series" manner which may be desirable in some applications.

The multilayer element 16 may also be provided with an appropriate stylus member 46 which is fixed or otherwise rigidly attached to or carried by the free end 16b of the multilayer element 16. The stylus member 46 may be adhesively secured to the multilayer element 16 by appropriate ears or extensions 48 which are bent about and conformed to the outer conductive layers of the multilayer element 16. If desired, these ears and the stylus member 46, or for that matter support 38, may be utilized as the shorting loop in place of loop 44 by conductively securing the ears 48 to the conductive layers. A spring arm extension 50 may extend an appropriate distance beyond the free end of the piezoelectric plate and conductive layer sandwich and is utilized to carry a stylus point 52 for contact with the recording medium 12. The stylus member 46 may be, if desired, a conventional phonograph-stylus with sapphire or diamond stylus point which are adapted and formed to be fastened to the plate and layer sandwich. The stylus point 52 may be supported in the position shown or on the opposite side of the spring arm 50, depending upon the desired orientation of the multilayer element 16 with respect to the recording medium 12 and its transport mechanism 14. The spring arm 50 may be utilized to provide a desired stylus force against the recording medium 12 to produce pressures sufficient to make the visible recordations on the recording medium. The stylus point 52 will move with the bending movement of the piezoelectric plates and conductive layers in the direction of the arrows shown in FIG. 2 on application of appropriate electric fields to the piezoelectric plates.

The piezoelectric plates 28 and 30 may be made from piezoelectric crystals which are appropriately cut along suitable crystallographic axes to provide the desired bending movement or they may be made from ferroelectric ceramics which are appropriately polarized to provide the desired bending movement on application of suitable electric fields. Typical piezoelectric crystal materials include lithium niobate, ammonium dihydrogen phosphate and Rochelle salt while typical ferroelectric ceramics may include solid solutions of such as barium titanate, lead zirconate titanates, lead tin zirconate titanates, and the like. The conductive layer 32 may be made of any appropriate metal film or sheet which will provide the desired support of the piezoelectric plates without substantially impeding the bending movement of element 16 with good electrical conductivity to provide uniform electric fields through the plates, such as brass, copper and alloys thereof. The outer conductive layers 34 and 36 may be of such as nickel or nickel-gold flash. The respective dimensions of the piezoelectric plates 28 and 30, and thus the overall dimensions of the multilayer element 16, may be selected to provide a desired deflection or bending movement of the stylus point 52 together with sufficient bending force to overcome the friction between the stylus point and the recording medium 12 and other losses. The amount of deflection of the stylus point 52 is determined by the distance between the support 38 and the free end of the piezoelectric plates, as well as the length of spring arm 50, while the force produced in bending is dependent on the width of the piezoelectric plates, and to a certain extent the thickness thereof and the piezoelectric characteristics and electric field strengths utilized. Typical dimensions may include a piezoelectric plate width of about 0.3 inch, a length of about 2 inches (an effective free end length of about 1 3/16 inches from support 38) and a thickness of about 0.009 inch. The conductive layer 32 may be about 0.002 inch thick for brass with outer conductive layers 34 and 36 of less than about 1 mil. These dimensions are typical for a piezoelectric material of lead zirconate titanate ferroelectric ceramic.

The spring arm 50 may be made of suitable resilient materials as stainless steel or beryllium copper, or the like while the support 38 may be made of an appropriate dimensionally stable plastic which is moldable and has good strength and insulative capability such as a phenolic or polycarbonate, or of appropriate metals. The spring arm 50 may typically have a length of about 0.75 inch.

Figure 4:
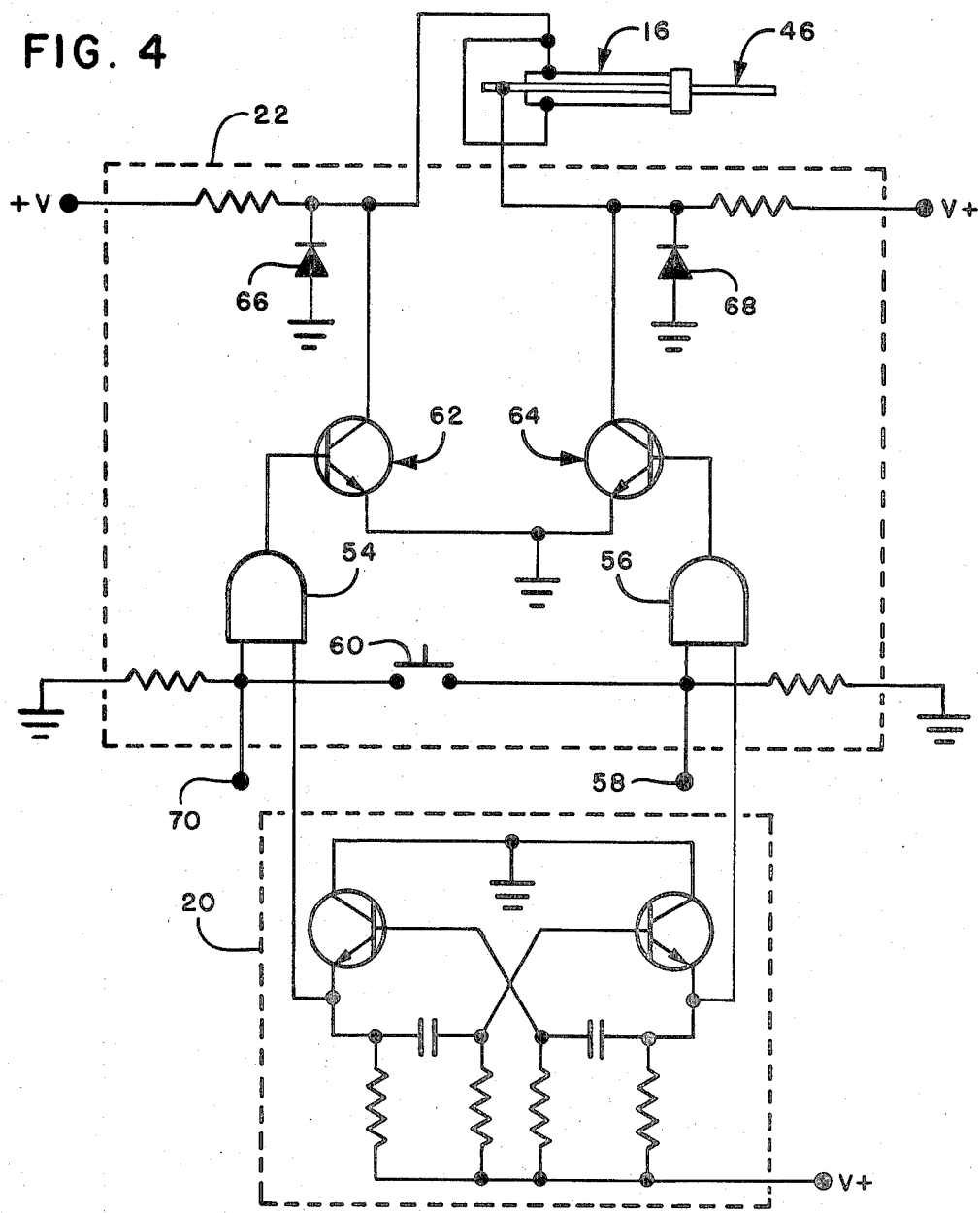
FIG. 4 is a schemtic view of a typical electrical circuit arrangement which may be utilized to control the operation of the multilayer element.

As stated above, the multilayer bender element 16 may be controlled by an appropriate oscillator 20, modulator 22 and information source 24 to provide the desired recordation of information on recording medium 12. A particularly simple, reliable and easily utilized circuit which performs with relatively low power consumption is illustrated in FIG. 4 for the parallel application of electric fields to the piezoelectric plates 28 and 30. In FIG. 4, the oscillator 20 is shown as a typical multivibrator circuit which may have appropriate circuit elements of fixed or variable size to provide a single or adjustable frequency signal output to the modulator 22. The oscillator 20 may be utilized to provide either an alternating sinusoidal or pulsating signal, as desired. An appropriate amplitude and polarity information signal from information source 24, assuming the multilayer element 16 is to be actuated by only one channel of information, may be coupled through terminal 58 and the closed switch 60 to an input of suitable gates 54 and 56 to enable or open the gates during the period of the information signal. The output signals of oscillator 20 may in turn be coupled to other input side of gates 54 and 56. The outputs of gates 54 and 56 are coupled through the emitter of appropriate switching transistors 62 and 64 to either the conductive layer 32 or outer conductive layers 34 and 36 of the multilayer element 16 via the base and collectors of transistors 62 and 64. The polarity and amplitude of the information source 24 signal at terminal 58 is selected so as to enable or open the gates 54 and 56 when it is desired to record the information or data. With an information signal at terminal 58, the oscillating signals of oscillator 20 are alternately coupled through transistors 62 and 64 to the multilayer element 16 to alternately deflect the stylus member 46 first in one direction and then in the other direction commensurate with the polarity of the oscillating signal of oscillator 20. A pair of appropriately grounded diodes 66 and 68, biased as shown, may be coupled to the collectors of transistors 62 and 64 and the multilayer element 16. These diodes will act to ground or dump the residual charge on the multilayer element 16 when the voltage is reversed by the alternating signals of oscillator 20 to make the stylus member 46 movement stronger and also minimize feedback of voltage generated by the bending of the piezoelectric plates to prevent possible burnout of the transistors by this voltage.

The number of movements of multilayer element 16 and stylus member 46 is thus determined by the time at which the information signal is present at terminal 58 and the frequency of the oscillator 20 output signal.

If it is desired, a single multilayer element may be operated to provide two channels of information by opening switch 60 and by application of the other channel of information to the input terminal 70. With this arrangement, the multilayer element 16 will bend in one direction from a center line in response to an input signal at terminal 70 and will bend in the other direction in response to an input signal at terminal 58, the respective bendings being in an oscillatory or alternating fashion from that center line.

Figure 5:
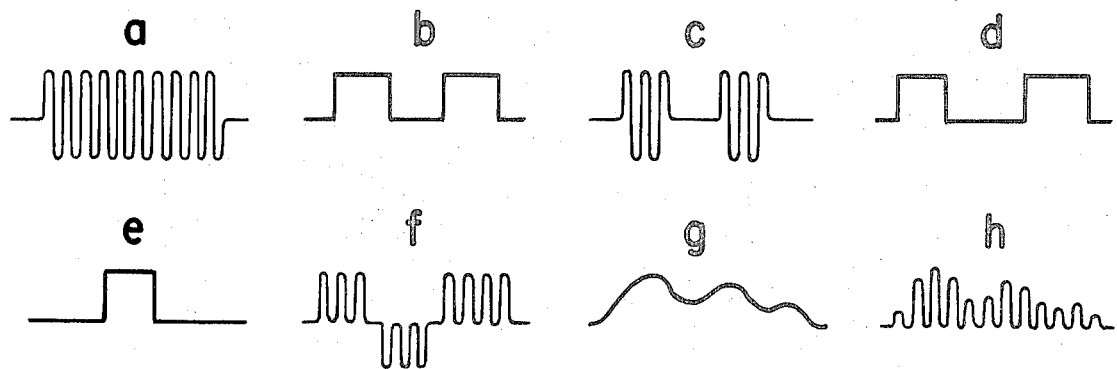
FIGS. 5a through h are diagrammatic representations of typical electrical signals and corresponding recordation symbols as produced by this invention.

FIGS. 5a through h show various of the electrical signals which are typical of the operation of this invention. FIG. 5a illustrates a typical alternating current signal from the oscillator 20 which may be utilized to apply electrical fields to the piezoelectric plates of the multilayer element 16. FIG. 5b shows a typical information signal from information source 24 which may be applied to terminal 58 with switch 60 closed. In such arrangement, the multilayer element 16 and stylus member 46 will be caused to vibrate during the presence of the pulses of information in the information signal to produce movement of the stylus point on the recording medium 12 in the manner shown in FIG. 5c, the number of movements being a function of the frequency of the signal of FIG. 5a with the spacing between oscillations being a function of the feed rate of recording medium 12. With switch 60 open and an information signal as shown in FIG. 5d applied to terminal 58 and an information signal as shown in FIG. 5e applied to terminal 70, the movement of the multilayer element 16 and stylus member 46 will be as shown in FIG. 5f.

As stated above, the amplitude of movement of the stylus point 52 is a function of the electric field amplitudes applied to the piezoelectric plates, the piezoelectric plate materials and their relative dimensions. Another factor may be the frequency of the alternating signal of oscillator 20. If this signal is at the resonant frequency of the multilayer element 16, the deflection may be considerably larger than at a nonresonant frequency. For example, in nonresonance, the multilayer element 16 having the dimensions set forth above, may move a total of about 1/8 inch from one extreme to the other while at resonance it may move a total of 1/4 inch. It may be desirable to operate the system at nonresonance in many applications as the resonant operation is subject to variations in oscillator 20 frequency which may be adversely affected by environmental factors as well as changing circuit parameters.

If it is desired, the multilayer element 16 may be caused to record an analog signal, as well as the digital signals already described, of the type illustrated in FIG. 5g by using a modulator 22 which amplitude modulates the alternating signal of oscillator 20 to provide a stylus member 46 movement of the type shown in FIG. 5h. In such an application, the resonant operation of the multilayer 16 may be preferred to provide increased amplitude fluctuation capabilities.

Figure 6:
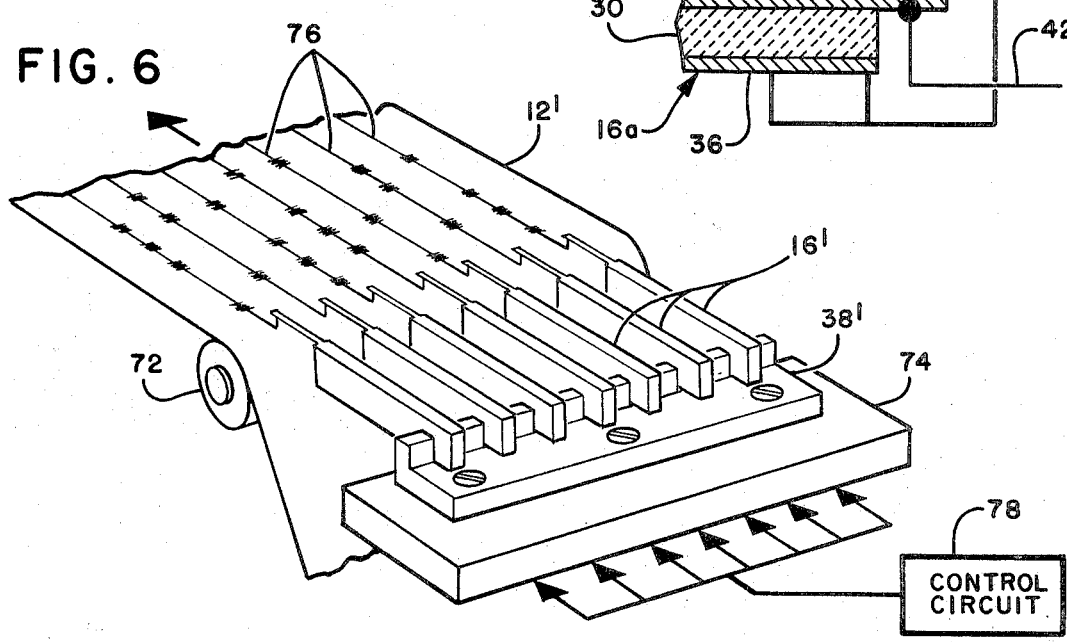
FIG. 6 is a perspective view of a portion of the recorder showing the relative locations of the multilayer elements and the recording medium and typical recorded information.

In most applications, many channels of information must be recorded simultaneously. In such a situation, a plurality of the multilayer element 16 may be mounted and supported on a single support 38, or series of supports mounted in line, so as to position the stylus point 52 of the elements 16 in side by side fashion across a recording medium 12. Such an application is shown in the simplified illustration of FIG. 6 in which the multilayer elements 16' are supported on a single supporting member 38' with their stylii in operative pressure contact with a recording medium 12'. The pressure of the stylii against recording medium 12' may be provided by supporting them in a position adjacent a roller 72 of the recording medium transport system by the pressure achieved with the spring arm of the stylus and position of the roller 72, supporting member 38', and its supporting wall 74. As the recording medium 12' is transported about the roller 72 in the direction of the arrow, the stylii will impress and record a line that is visible on the recording medium 12' for each of the multilayer elements 16', such as is shown by lines 76, from information signals processed by control circuit 78 and coupled to elements 16' as shown by the arrows. Recorded bits of information are illustrated for an operating mode as described above with respect to FIGS. 5b and c using a control circuit arrangement of the type shown in FIG. 4 for each multilayer element 16'.

A recorder system made in accordance with the embodiment illustrated in FIGS. 1, 2, 4 and 6 and operated in the manner described with respect to FIGS. 5b and c was made in a suitable housing with supporting apparatus for the transport mechanism which permitted ready change of the recording medium 12 and which included 32 multilayer elements 16 arranged to record on a recording medium having a total width of 5.25 inches. The recorder system utilized a 14 volt battery with a peak current drain of about 170 milliamperes and an average current drain of about 35 milliamperes in recording 32 channels of information over a several month period without battery change. The recorder without battery weighed a total of about 3.7 pounds, was about 7 by 9 by 3 inches in size, and was capable of withstanding $50g$ shock loading and 6 to $8g$ vibration loads. The same recorder system, by opening the switches 60 in the modulators 22 and by using the other input terminals to the modulator, may record 64 channels without additional circuitry or power consumption in the same size and weight recorder system. The digitally recorded information was of sufficient contrast to be scanned and read by automated readers directly from the recording medium 12.

I claim:

1. A system for recording information on a recorder medium comprising a multilayer element having first and second piezoelectric plates separated by an electrically conductive layer; means for rigidly supporting one end of said element with the other end free for sideways bending movement; a stylus carried adjacent the free end of said element and extending therefrom; means for transporting said recorder medium past and in contact with said stylus in a direction transverse to said free end movement; means for generating a continuously oscillating electrical signal; means for modulating said continuous oscillating signal in response to two channels of information providing modulated oscillating electrical signals representative of said information; and means for coupling said modulated oscillating electrical signals to the piezoelectric plates of said element for initiating free end movement on one side of a center line for one channel of information and on the other side of said center line for the other channel of information commensurate with said modulated oscillating electrical signals.

* * * * *